United States Patent [19]
Cook

[11] 3,878,030
[45] Apr. 15, 1975

[54] MARBLE LAMINATE STRUCTURE

[76] Inventor: Grafton H. Cook, P.O. Box 924, Lake Forest, Ill. 60045

[22] Filed: May 29, 1973

[21] Appl. No.: 364,524

[52] U.S. Cl. ............ 428/45; 52/612; 156/71; 428/49
[51] Int. Cl. .............................................. B32b 3/14
[58] Field of Search ............ 161/36, 37, 40, 38, 39, 161/41, 44, 185, 200, 209, 270; 156/41, 71, 154, 153; 51/283; 52/612, 615, 747

[56] References Cited
UNITED STATES PATENTS

| | | | |
|---|---|---|---|
| 2,100,424 | 11/1937 | Bachelder | 52/747 X |
| 2,114,474 | 4/1938 | Labra | 161/37 X |
| 2,738,825 | 3/1956 | McElroy | 161/40 X |
| 3,209,500 | 10/1965 | Bernett | 161/40 R |
| 3,501,875 | 3/1970 | Mailly | 52/79 X |
| 3,723,233 | 3/1973 | Bourke | 52/612 X |
| 3,724,152 | 4/1973 | Castellarin | 161/40 X |

FOREIGN PATENTS OR APPLICATIONS

| | | | |
|---|---|---|---|
| 74 | 12/1913 | Netherlands | 161/270 |

*Primary Examiner*—Willaim E Schulz
*Attorney, Agent, or Firm*—Hill, Gross, Simpson, Van Santen, Steadman, Chiara & Simpson

[57] ABSTRACT

A composite marble laminate structure and method of making same having a base layer of a wood product with a surface layer of marble pieces bonded thereto, the marble pieces being bonded to the wood layer by a two part curable bonding material prior to surface finishing of the marble layer and thereafter subjecting the structure to a grinding and polishing process including a water bath.

12 Claims, 4 Drawing Figures

MARBLE LAMINATE STRUCTURE

BACKGROUND OF THE INVENTION

1. Field of the Invention

This invention relates to laminate structures and more particularly to a laminate of wood and stone.

2. The Prior Art

Stone, and particularly marble, is often used as a surface material. Marble is sometimes used as a flooring or as a wall surfacing. More particularly, stone, and oftentimes marble, is used as a furniture surface. Where marble is used purely as a surfacing material, it has heretofore normally been used in large slabs. These slabs may be on the order of an inch or more in thickness and have considerable weight.

When dealing with stone, the texture of the particular strata from which it is cut is of the greatest importance in creating the desired aesthetic appearance for the final surface. It is often difficult to find acceptable texture in large stone formations, which formations can then be cut to provide the slabs. Certain kinds of highly desirable stone such as types of marble or onyx, etc. are not readily found in large pieces but are available in smaller sized formations.

It has been known in the prior art to utilize smaller formations having the desired texture and to cut smaller slab sizes so that the final surface is formed as a composite of a series of side by side smaller pieces. However, the smallness of the pieces which can be used is limited by the necessity of finishing the pieces to achieve the desired smoothness and lustre. Small pieces are difficult to finish.

Additionally, the necessity of utilizing thick slabs has limited the application of stone as a surfacing material. Slabs on the order of an inch or greater cannot find as widespread utilization, particularly in the furniture industry, as could thinner structures. However, attempting to cut stone in thinner pieces has created a problem in the finishing process. Stone is finished through a grinding and polishing operation which applies great heat and pressure to the material. Relatively thin pieces cannot survive the finishing operation. The stresses imparted to the piece during the operation will cause thin pieces to shatter or break.

The prior art has suggested solving this problem, particularly with marble by bonding a plurality of small pieces having the desired texture and thinness to an underlying piece of the same material. The underlying piece is then chosen from stone strata which does not have the desired texture and which is therefore less expensive. In this manner, the more expensive desirable pieces can be cut thin so as to increase their economic utilization and are bonded to a generally thicker layer of less valuable stone.

However, the bonding of stone to stone still produces a relatively thick and quite heavy structure. Additionally, such stone to stone structures are brittle and require considerable care in finishing, handling, storage and installation.

Another disadvantage with prior art stone surfacing materials is the difficulty in shipping and attaching. Since stone slabs cannot easily be screwed or otherwise attached to furniture, it has been necessary to design the furniture to accommodate a separate slab which must then be packaged and shipped separately from the furniture piece.

It would be an advance in the art of stone surfacing materials if a laminate structure could be provided which utilized a thin surface of discrete pieces of stone bonded to a support surface of a material having a lesser density than stone. An ideal such material would be wood or a wood product. However, because the finishing operation to provide the desired surface to the stone requires immersion in a water bath, it has not heretofore been possible to bond finishable stone to a wood base. Immersion of the composite structure in a water bath and subjecting the structure in the bath to a grinding and polishing operation would result in a swelling of the wood structure sufficient to destroy the composite structure or at least sufficient to impart a severe warpage to the structure such that the polishing and grinding operation could not be completed or if completed, would result in a warped product.

SUMMARY OF THE INVENTION

My invention provides a practical and economical stone-wood laminate structure and method of making the same. In one embodiment, I provide a piece of wood product, such as a fiberboard, as an underlayment. I then apply a bonding material, preferably a two-part curable cement to the underlayment and/or to one surface of a plurality of discrete pieces of relatively thin stone. The stone pieces are then placed on the top of the underlayment and the cement is allowed to cure to firmly bond the pieces to the underlayment. Thereafter, the bonded together structure is subjected to a finishing operation including a grinding operation while subjected to a water bath and then to a polishing operation such as the use of a felt polishing wheel in connection with a tin oxide slurry or powder. The finishing operations smooth the stone to provide a polished top surface for the composite structure. When I refer to stone herein, I am using it in a generic sense including, for example, products such as slate, marble, onyx, etc.

In another embodiment, the underlayment may comprise a wood board. The wood board may be assemblied into the final structure as in the first embodiment or, preferably, is subjected to a first operation to apply a sealer to at least all of the surfaces of the board except for the top surface to which the cement is applied. By applying a sealer to the surfaces of the board, the board will not absorb significant moisture during the finishing operations.

I have found that my invention provides a satisfactory composite wood-stone laminate structure without severe warpage and of satisfactory thickness and weight for use as a surfacing structure, particularly for furniture but equally usable for flooring or wall covering.

My invention allows the use of a low grade veined marble having aesthetic appearances which can be cut into small, thin pieces and yet, which, when assembled according to the teachings of my invention, result in a superior grade surface product.

It is therefore an object of this invention to provide a stone-wood laminate structure with the stone bonded to the wood, the stone having a surface thereof polished in situ and planar.

It is another object of this invention to provide a method of producing a stone-wood laminate structure with a stone surface bonded to a wood underlayment, the structure being subjected to a water bath finishing operation, the method providing a planar nonwarped structure.

Other objects, features and advantages of the invention will be readily apparent from the following description of a preferred embodiment thereof, taken in conjunction with the accompanying drawings, although variations and modifications may be effected without departing from the spirit and scope of the novel concepts of the disclosure, and in which:

DESCRIPTION OF THE PREFERRED EMBODIMENTS

Figure 1:
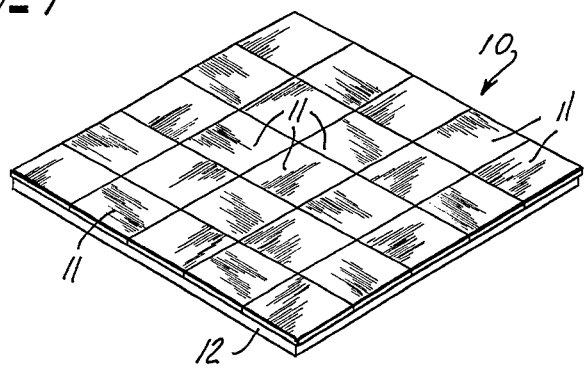
FIG. 1 is a perspective view of a stone-wood laminate structure according to this invention.

FIG. 1 shows a marble wood laminate structure according to this invention. The structure consists of a plurality of discrete marble pieces 11 bonded to a wood underlayment 12. The pieces 11 are illustrated as being square and have a thickness less than the underlayment.

Figure 2:
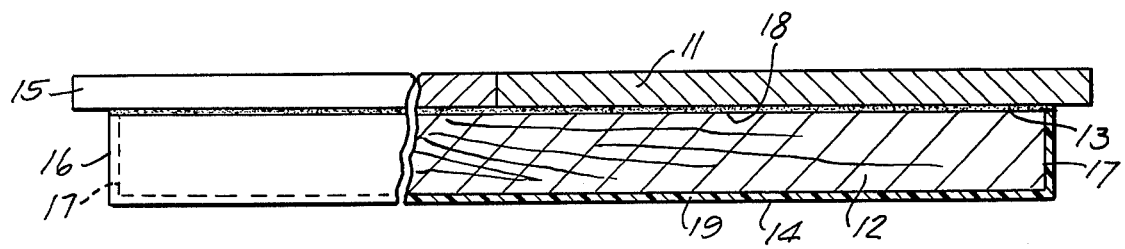
FIG. 2 is a fragmentary side and cross-sectional view of the structure of FIG. 1 on an enlarged scale.

As best illustrated in FIG. 2, each of the pieces 11 is bonded to the underlayment 12 by a layer of bonding material 13 such as an epoxy cement.

FIG. 2 also illustrates that the outer periphery 15 of the marble layer can extend beyond the outer periphery 16 of the underlayment.

In the preferred form, the underlayment 12 consists of a wood composite member such as a fiberboard. However, in an alternative embodiment, a dense wood or hard wood may be utilized for the underlayment. Preferably, in the latter case, the faces 17 of the underlayment, except for the top surface 18 to which the marble structure is to be bonded, are sealed with a coating layer 19 prior to the assembly of the composite structure. Various coating layers may be utilized such as, by way of example, vinyl or an epoxy sealer or other water impenetrable plastics which can be applied to the underlayment by any of numerous prior art techniques such as dipping, spraying or painting. This technique is also useful when working with thinner pieces of fiberboard or other wood product boards.

Although the underlayment is herein described as a wood product, it is to be understood that only the denser wood products are usable in this invention. Examples are masonite, some forms of plywood, fiberboard, and wood paneling. Low crush resistance wood products such as most typical forms of press board, are not through to be practical. In the preferred embodiment, the wood product is known as Mayfibre board. I have achieved satisfactory results using wood products with a density of 60 pounds per cubic foot, which is referred to herein as a 60 pound test board.

The surface layer or marble layer can be formed of any dense stone such as marble and preferably comprises marble pieces which are small enough to have a significant resistance to breaking in relation to their thickness. The marble layer may be on the order of one-quarter inch in thickness initially and the underlayment may be on the order of ⅝ inch in thickness of less.

The bonding or cement layer is preferably a two-part epoxy. Satisfactory results have been achieved with a two-part epoxy available from Cadillac Plastic Company of Chicago, Illinois wherein one part is a polyester resin identified as "Cad-Co. Polyester Resin" and the hardener is identified as "MEK" which is a Methyl-Ethyl-Ketone hardening agent.

Preferably, the epoxy is placed on either the underlayment or the undersurface of the marble layer or both. It has been found in experimenting that the two-part epoxy cements are much superior to straight unmixed glues or cements. The latter do not cure properly and marble layers applied with such one-stop cements have a tendency to shatter and break during the grinding and polishing steps. This may be due, in part, to the difficulty in eliminating any air spaces between the surface of the underlayment and the undersurface of the marble layer.

Figure 3:
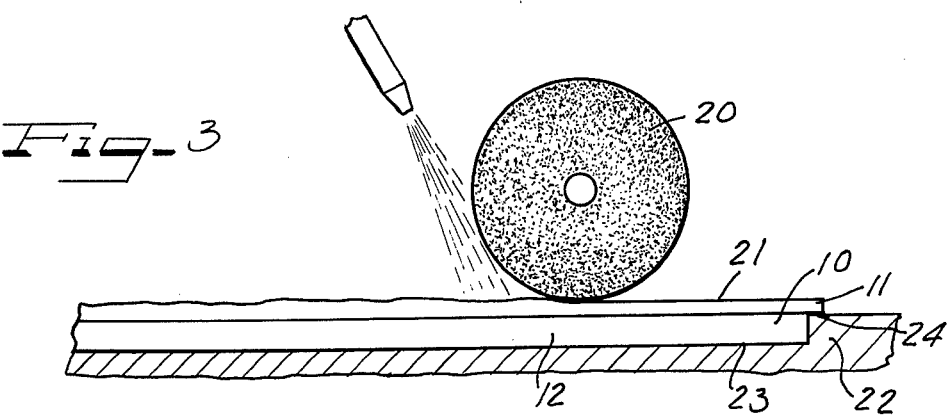
FIG. 3 is a diagrammatic view illustrating a finishing operation in the production of the structure of FIGS. 1 and 2.

After application of the epoxy and the placing in position of the marble layer on the underlayment, the resultant laminate is set aside to cure. When sufficient time has elapsed for the epoxy cement to have cured, the laminate is subjected to a finishing operation. The finishing operation consists, as diagrammatically illustrated in FIGS. 3 and 4, of subjecting the laminate structure 10 to the grinding operation by a rough grinding device such as a diamond wheel 20 while in a water or other fluid bath which may be applied as by spraying as illustrated at 21. Alternatively, the laminate 10 can be submerged in a bath during the grinding operation. Normally, two grinding operations are provided, one with a rough wheel and the other with a finer wheel. The grinding operations are continued until the top surface 21 is substantially planar and flat.

In those instances where it is desired to provide a support for the laminate, a bed 22 may be used underneath the structure during grinding. The bed 22 may be moving bed and is preferably contoured to provide a recess 23 having a ledge 24 with the underlayment 12 received in the recess 23 and the extending peripheries of the marble layer 11, if any, projecting over the ledge 24 so as to provide support to the peripheries of the marble layer which overhang the underlayment. In this manner, the peripheral overlay of the marble will not be broken off when subjected to the grinding operation. It will be understood that the grinding operation produces a great deal of heat and weight. It should also be understood that although a water spray 21 is illustrated, the grinding operation is often performed in a water bath with the article submerged or at least partially submerged.

Figure 4:
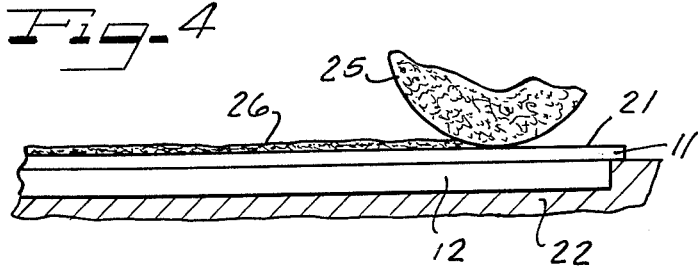
FIG. 4 is a view similar to FIG. 3 illustrating another step in the production of the structure of FIGS. 1 and 2.

FIG. 4 diagrammatically illustrates a final polishing step to provide the appropriate and desired smooth surface 21 on the top of the marble layer. The polishing operation involves a felt or other softer disk or wheel 25 and a fine powder slurry 26 such as a tin oxide slurry.

During normal production, it is anticipated that in the finishing operations including the grinding and polishing operations, the product may be submersed or subjected to water for periods from one-half hour upwards. It is this requirement of subjecting the structure to a great deal of moisture which has led the prior art practitioners to completely discard or not attempt the production of any stone-wood laminate structure where the smooth surface of the stone is formed in situ after bonding the stone to the wood base.

By using a sufficiently dense wood product underlayment such as the preferred Mayfibre board or by using the sealing process of sealing the surfaces of the board, together with the use of a two-part curable epoxy cement, I have been able to produce stone-wood laminate structures having finishing polished surfaces formed in situ after bonding of the stone to the wood fiber underlayment without sacrificing quality and without experiencing excessive warp.

EXAMPLE I

Using perlato marble cut in rough into 5/16 inch thick pieces, the pieces being 6 × 12 inches, I produces a satisfactory marble-wood laminate structure. The marble pieces were bonded to a piece of 12 × 60½inches 60 pound test Mayfibre board in a staggered pattern. The bonding was done with a polyester resin containing a styrene monomer. A hardener was applied as the second part of a two-part epoxy cement. After allowing the bonded laminate to cure, the structure was put through a heavy surfacer using a diamond grinding wheel and then two grip polishings and a final polish with a felt wheel and tin oxide. During the grinding and finishing operations, the laminate structure was subjected to pressure and heat for in excess of 30 minutes and was submerged in water for the entire time. The resultant product showed no warpage either horizontally or vertically and the bonding of the marble to the underlayment was secure. The marble pieces were not cracked or broken during the grinding or finishing operations.

EXAMPLE II

Yellow sienna marble was cut rough in 5/16 inch thick pieces measuring 4 × 8 inches. These were bonded to a 12 × 60½inch 60 pound test Mayfibre board in parallel pattern three marble pieces wide on the board. The bond was the same as in Example I. The resultant laminate structure was subjected to all four surfacing and polishing operations described in Example I, however, the operations were spaced apart whereby the laminate structure was subjected to both wet and dry alternating conditions. Upon finish polishing of the product, an immediate test was made for warp. A warp was noticed measuring 13/16 inch in 60 inches. The laminate structure was weighted against a flat surface and allowed to dry. After 28 hours the weight was removed and the laminate structure was substantially flat with no noticeable warp. The bond was secure and the underlayment was in good condition.

EXAMPLE III

In this experiment, I used three thicknesses of yellow sienna marble: 5/16 inch, ¼ inch and 3/16 inch thick. The pieces were formed 4 × 8 inches and were bonded to a 49 × 61 inch ¾ inch 60 pound Mayfibre board by the two-part epoxy described in connection with Example I. The pieces were staggered in position. The epoxy was allowed to cure for at least 14 hours. Thereafter, the laminate structure was subjected to a heavy surface grinding machine for approximately one-half hour with the laminate submerged in water for the entire time. A total warp approximately ½ inch was noticed after the heavy grinding. The product was then allowed to dry for approximately 14 hours. Thereafter, the laminated product was subjected to a side cutting operation to bevel the sides and to provide a 45 × 60 oval table top. This step requires exposure to a water bath for approximately one hour. The laminate structure cut as a single piece without damage to the marble. After completion of this step, a warp of approximately ⅜ inch was noted along the length of the oval and a warp of approximately ¼ inch along the width of the oval.

After completion of the forming operation, the structure, while still wet, was exposed for approximately 72 hours in a moisture atmosphere. This slightly increased the warpage, without breaking the bond. Thereafter, the laminate structure was subjected to the grit polishing and finishing operations and a finished edge polishing operation. The resultant structure was then left to dry and within 48 hours practically no noticeable warp could be observed thereby resulting in a finished marble-wood product laminate structure with a planar, smooth surface formed in situ without damage to the marble and without separating the bond between the marble and wood fiber underlayment.

EXAMPLE IV

Using the above technique I bonded 4 inch × 8 inch pieces of yellow sienna marble 3/16 inch thick to a 40 × 40 inch 60 pound test Mayfibre board having a thickness of ¾ inch. The bonding was done with "Cad-Co. Polyester Resin" and "MEK" hardener. The bonded laminate was allowed to cure for approximately 12 hours without any weight applied to the laminate. Thereafter the structure was subjected to a three step finishing process including immerging in a water bath. The process comprised the steps of rough grinding with a rough diamond grinding wheel in the water bath for approximately 15 minutes, honing the surface with a finer honing wheel in a water bath for approximately 15 minutes, and, fine polishing with a tin oxide slurry and a felt polishing wheel for approximately 15 minutes. The resultant structure displayed no noticeable warpage and had a smooth, planar surface. Thereafter the edges of the product were beveled at an angle of approximately 45° inward from the juncture of the stone layer and wood layer. The bevel removed peripheral portions of the wood layer.

EXAMPLE V

I have also produced a stone-wood laminate structure wherein the stone layer comprised rectangular pieces of onyx bonded with a two-part epoxy bonding material to a 16 × 32 × ⅝ inch 60 pound test Mayfibre board. After curing, the laminate was subjected to grinding and polishing operations including immersion in a water bath. The resultant product illustrated no warpage and clearly showed the applicability of my method to the production of high quality stone-wood laminate structures with a smooth surface formed in situ after bonding the laminate.

It can therefore be seen from the above that my invention provides both a method for producing and a stone-wood laminate structure with a smooth surface formed in situ after lamination by a process which requires grinding while subjected to a water bath and which is capable of producing a finishing product without substantial warpage and without damage to thin pieces of stone. The resultant product may be cut or otherwise treated after formation without breaking the bond between the stone and the underlayment.

Although the teachings of my invention have herein been discussed with reference to specific theories and embodiments and although illustrative means for accomplishing explained results have been described, it is to be understood that these are by way of illustration only and that others may wish to utilize my invention in different designs or applications.

I claim as my invention:

1. A stone faced laminate structure comprising a thin layer of discrete pieces of stone bonded by a curable bonding material to a surface of a wood fiber underlayment, the layer of stone having a top surface thereon remote from the underlayment, the top surface being smooth and planar and finished in situ after bonding to the underlayment and said stone having a rough bottom surface bonded to the underlayment.

2. The structure of claim 1 wherein the bond forms a bond layer intermediate the marble and the underlayment, the bond layer comprising a two-part epoxy cement.

3. The structure of claim 2 wherein the underlayment has top, bottom and side surfaces and at least some of said surfaces are coated with a water impervious coating.

4. The method of constructing a composite structure of stone on wood which comprises the steps of:
providing an underlayment of a board of wood fiber of less than 1 inch thickness,
providing a substantially planar top surface on the underlayment,
providing a plurality of discrete pieces of stone having a thickness of less than ½ inch and top and bottom rough cut surfaces generally parallel to one another,
applying to bottom surfaces of the stone pieces to the top planar surface of the underlayment with a curable bonding material,
curing the bonding material to bond the stone pieces to the underlayment,
subjecting the resultant composite structure to a water bath,
subjecting the top surfaces of the stone pieces to a rough grinding with the composite subjected to the water bath,
then subjecting the top surfaces of the stone pieces to a finish polishing operation with the composite subjected to a water bath to produce a smooth top surface on the composite,
then removing the composite from the water bath and drying the composite structure.

5. The method of claim 4 including the additional step of applying a sealing coating to all surfaces of the underlayment other than the planar top surface before applying the stone pieces.

6. A stone faced composite structure comprising an underlayment, said underlayment comprising a wood fiber structure of a density of at least 60 pounds per cubic foot and a thickness of less than 1 inch, a top layer of stone, the stone having a thickness of less than ½ inch, the top layer including a plurality of discrete pieces, an intermediate layer of bonding material bonding bottom surfaces of the pieces to a top surface of the underlayment, the bonding material being a two-part epoxy cement, the bottom surface of the pieces being rough, the top surface of the top layer being smooth polished in situ and planar.

7. The structure of claim 6 wherein side and bottom surfaces of the underlayment are coated with a water impervious sealant.

8. The structure of claim 6 wherein peripheral portions of the top layer extend beyond peripheral portions of the underlayment.

9. The method of claim 4 including the further step of cutting the composite structure to size after curing the bonding material.

10. The structure of claim 1, wherein the stone is marble.

11. The structure of claim 1, wherein the stone is onyx.

12. The structure of claim 10, wherein the marble is less then ½ inch thick and the underlayment is less than 1 inch thick.

* * * * *